United States Patent
Kimura et al.

(10) Patent No.: US 10,477,336 B2
(45) Date of Patent: Nov. 12, 2019

(54) INFORMATION PROCESSING DEVICE, INFORMATION PROCESSING METHOD, AND PROGRAM

(71) Applicant: SONY CORPORATION, Tokyo (JP)

(72) Inventors: Kentaro Kimura, Tokyo (JP); Tomohiko Gotoh, Kanagawa (JP); Shunsuke Mochizuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 49 days.

(21) Appl. No.: 15/559,586

(22) PCT Filed: Feb. 8, 2016

(86) PCT No.: PCT/JP2016/053681
§ 371 (c)(1),
(2) Date: Sep. 19, 2017

(87) PCT Pub. No.: WO2016/185740
PCT Pub. Date: Nov. 24, 2016

(65) Prior Publication Data
US 2018/0048976 A1    Feb. 15, 2018

(30) Foreign Application Priority Data
May 18, 2015   (JP) .................. 2015-100638

(51) Int. Cl.
*A63F 9/24* (2006.01)
*H04S 5/02* (2006.01)
(Continued)

(52) U.S. Cl.
CPC .......... *H04S 5/02* (2013.01); *H04M 3/42365* (2013.01); *H04R 5/02* (2013.01); *H04S 1/00* (2013.01);
(Continued)

(58) Field of Classification Search
CPC ......... G06F 3/011; G06F 3/167; G06T 19/006
See application file for complete search history.

(56) References Cited

U.S. PATENT DOCUMENTS 8,903,104 B2 * 12/2014 Norris .................... H04R 5/033
381/309
9,111,326 B1 * 8/2015 Worley, III ........... G06T 19/006
(Continued)

FOREIGN PATENT DOCUMENTS

| JP | 2003-305278 A | 10/2003 |
| JP | 2004-348647 A | 12/2004 |
| JP | 2013-5021 A | 1/2013 |

OTHER PUBLICATIONS

International Search Report dated Mar. 22, 2016 in PCT/JP2016/053681 filed Feb. 8, 2016.

*Primary Examiner* — David L Lewis
*Assistant Examiner* — Eric M Thomas
(74) *Attorney, Agent, or Firm* — XSENSUS LLP

(57) ABSTRACT

[Object] To provide an information processing device, control method, and program that are capable of showing presence of a virtual object in a real space.
[Solution] The information processing device includes: a calculation unit configured to calculate a localization position of a sound source of a virtual object relative to a user on the basis of information on the virtual object and information on a state of the user, the virtual object causing the user to feel as if the virtual object exists in a real space through sound image localization; and a sound image localization unit configured to perform a sound signal process of the sound source such that a sound image is localized at the calculated localization position.

12 Claims, 10 Drawing Sheets

(51) Int. Cl.
*H04S 1/00* (2006.01)
*H04M 3/42* (2006.01)
*H04S 7/00* (2006.01)
*H04R 5/02* (2006.01)

(52) U.S. Cl.
CPC .......... *H04S 7/303* (2013.01); *H04R 2460/07* (2013.01); *H04S 2400/03* (2013.01); *H04S 2400/11* (2013.01)

(56) References Cited

U.S. PATENT DOCUMENTS

| 9,361,729 B2* | 6/2016 | Narayanan ............ G06T 19/006 |
| 2004/0240652 A1 | 12/2004 | Kanada |
| 2012/0314871 A1 | 12/2012 | Koga |

\* cited by examiner

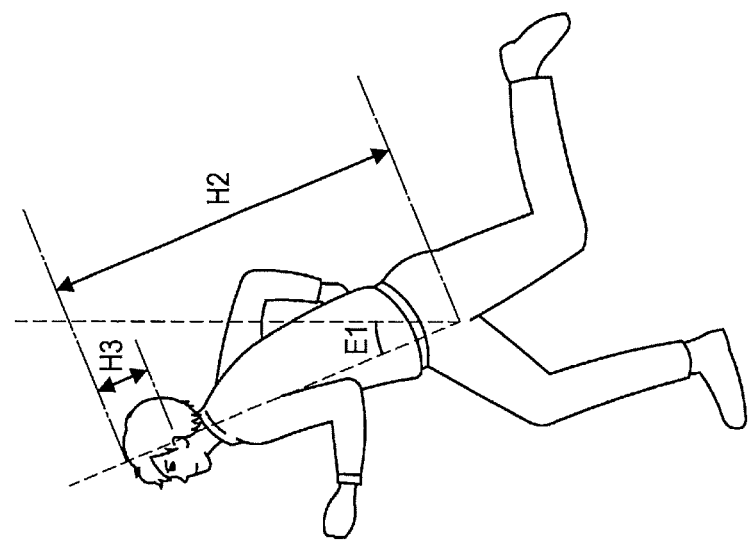
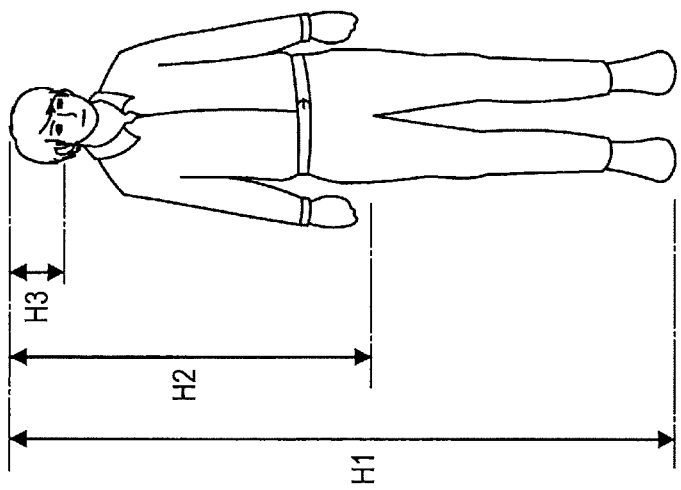
FIG. 4

FIG. 6
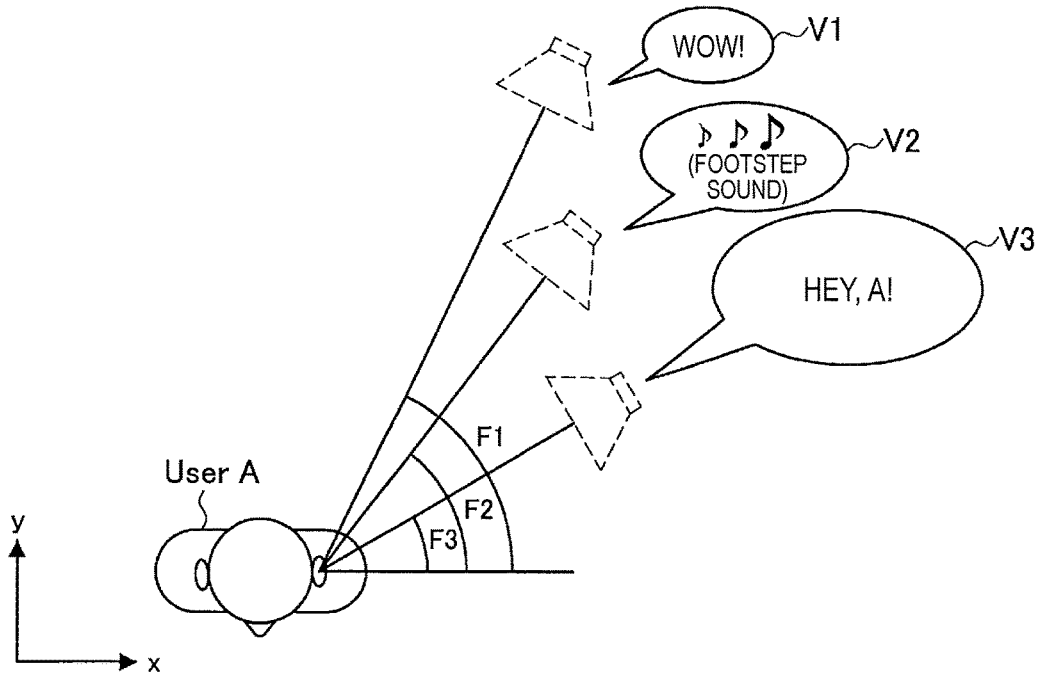
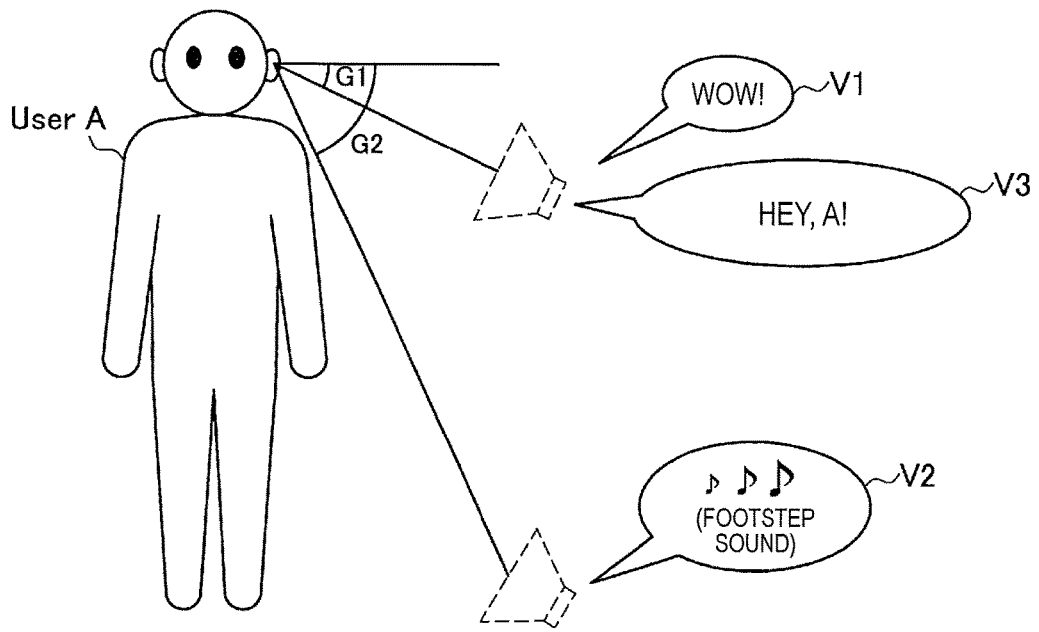

FIG. 7
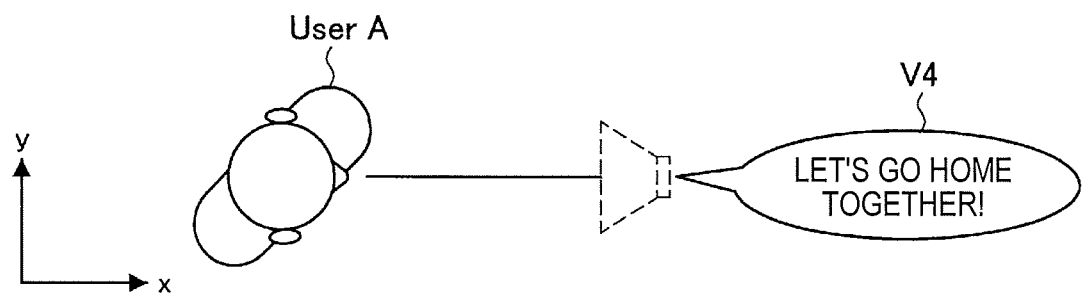
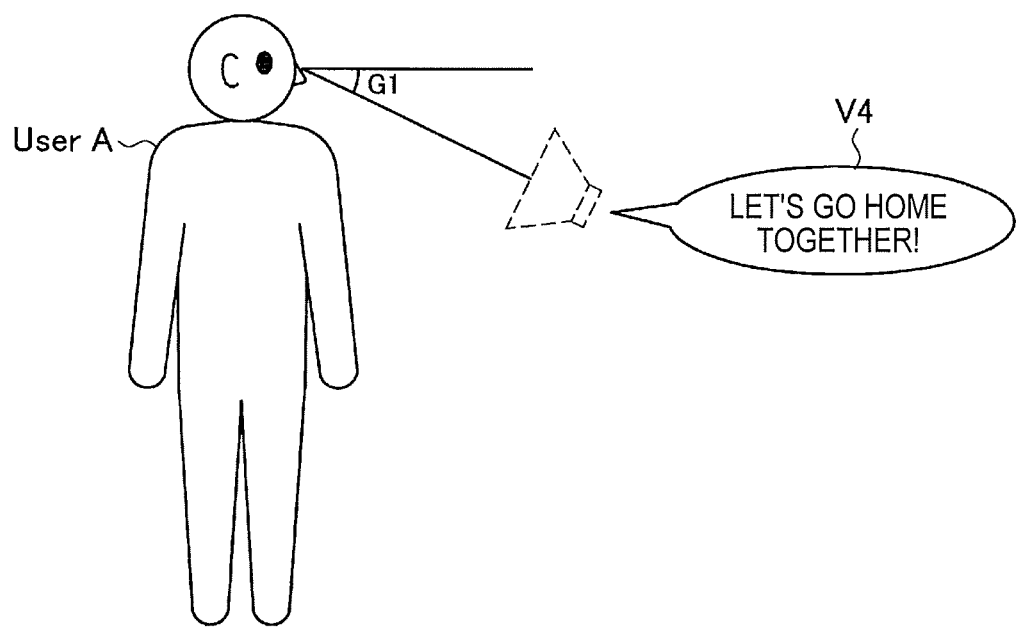

FIG. 10
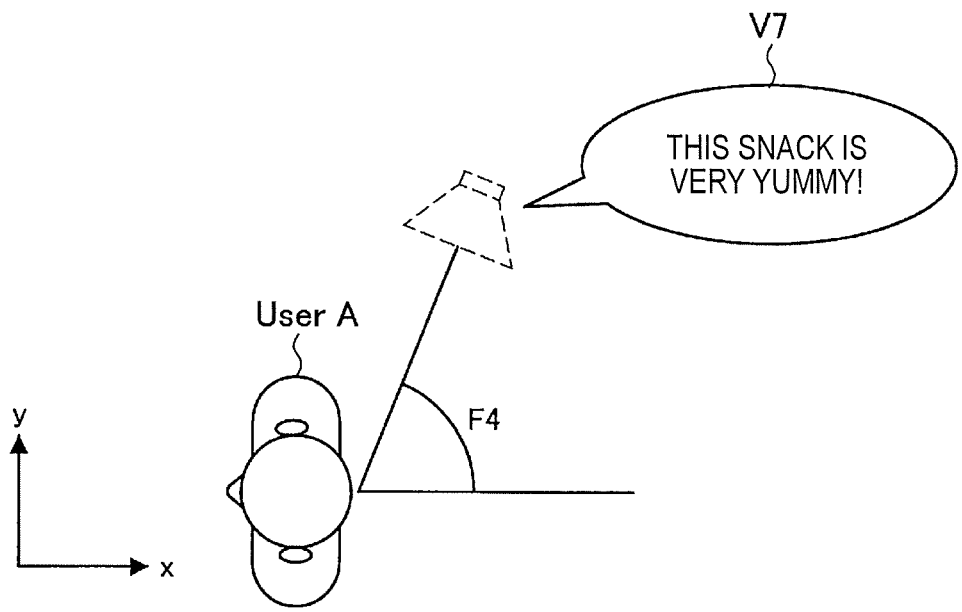
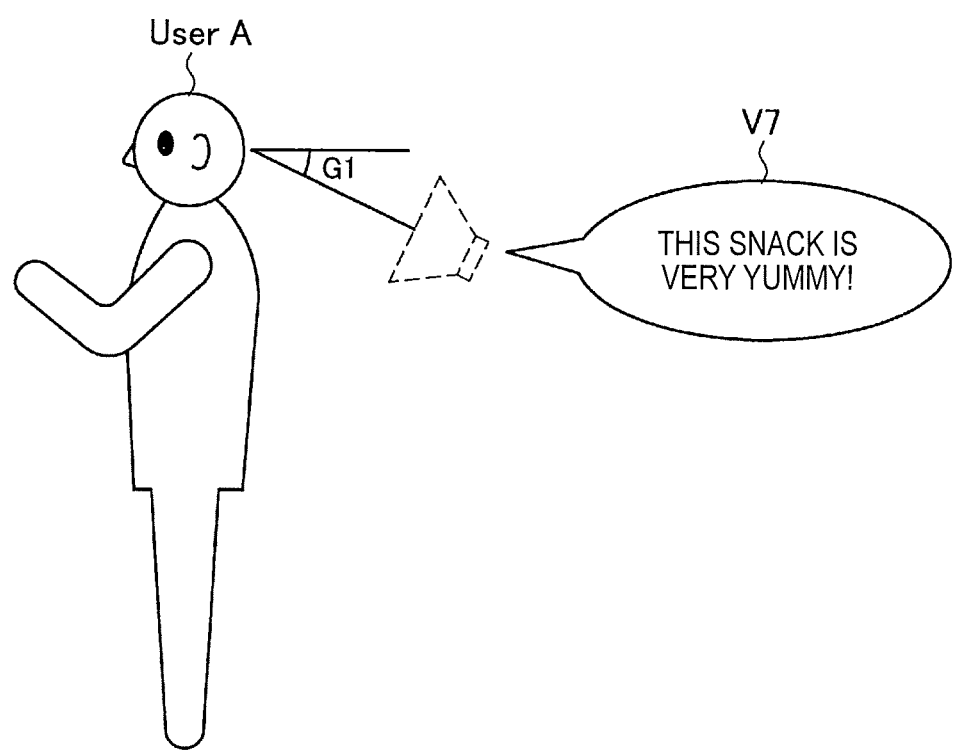

INFORMATION PROCESSING DEVICE, INFORMATION PROCESSING METHOD, AND PROGRAM

TECHNICAL FIELD

The present disclosure relates to information processing devices, information processing methods, and programs.

BACKGROUND ART

As the information processing technology and the information communication technology have been developed, computers have been widespread and actively used for amusement and support in daily lives. In recent years, computer processing has been used also in entertainment fields. Such entertainment is given to not only users working in a specific place such as an office or a house, but also users during traveling.

With regard to the entertainment during traveling, for example, Patent Literature 1 proposes an information processing device configured to control interaction with a character displayed on a screen in accordance of rhythm of a body of a traveling user, cause the user to feel an affinity for the character, and make the traveling itself into an entertainment content.

CITATION LIST

Patent Literature

Patent Literature 1: JP2003-305278A

DISCLOSURE OF INVENTION

Technical Problem

However, in Patent Literature 1, an image of the character is displayed on a display screen. Therefore, it is difficult to enjoy the entertainment content in a situation in which it is difficult to see the screen such as during walking or running. In addition, although sometimes sound or vibration corresponding the interaction with the character are output in accordance with rhythm of the body of the user according to Patent Literature 1, it is not considered in Patent Literature 1 to cause the user to feel reality as if the character actually exists there.

Accordingly, the present disclosure proposes an information processing device, control method, and program that are capable of showing presence of a virtual object in a real space.

Solution to Problem

According to the present disclosure, there is provided an information processing device including: a calculation unit configured to calculate a localization position of a sound source of a virtual object relative to a user on the basis of information on the virtual object and information on a state of the user, the virtual object causing the user to feel as if the virtual object exists in a real space through sound image localization; and a sound image localization unit configured to perform a sound signal process of the sound source such that a sound image is localized at the calculated localization position.

According to the present disclosure, there is provided an information processing method including: calculating, by a calculation unit, a localization position of a sound source of a virtual object relative to a user on the basis of information on the virtual object and information on a state of the user, the virtual object causing the user to feel as if the virtual object exists in a real space through sound image localization; and performing, by a sound image localization unit, a sound signal process of the sound source such that a sound image is localized at the calculated localization position.

According to the present disclosure, there is provided a program causing a computer to function as: a calculation unit configured to calculate a localization position of a sound source of a virtual object relative to a user on the basis of information on the virtual object and information on a state of the user, the virtual object causing the user to feel as if the virtual object exists in a real space through sound image localization; and a sound image localization unit configured to perform a sound signal process of the sound source such that a sound image is localized at the calculated localization position.

Advantageous Effects of Invention

As described above, according to the present disclosure, it is possible to show presence of a virtual object in a real space.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is an explanatory diagram illustrating preset physique data of a user according to the embodiment.

FIG. 6 is an explanatory diagram illustrating an example of sound image localization in accordance with a state of a user and behavior and a height of a virtual character according to the embodiment.

FIG. 7 is an explanatory diagram illustrating an example of sound image localization in accordance with a state of a user and behavior and a height of a virtual character according to the embodiment.

FIG. 10 is an explanatory diagram illustrating another example of sound image localization in accordance with a state of a user and behavior and a height of a virtual character according to the embodiment.

MODE(S) FOR CARRYING OUT THE INVENTION

Figure 1:
FIG. 1 is an explanatory diagram illustrating an overview of an information processing device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that the description is given in the following order.
1. Overview of information processing device according to embodiment of present disclosure
2. Configuration
2-1. External configuration
2-2. Internal configuration
3. Operation
4. Conclusion <<1. Overview of Information Processing Device According to Embodiment of Present Disclosure>>

First, with reference to FIG. 1, an overview of an information processing device according to an embodiment of the present disclosure will be described. As illustrated in FIG. 1, an information processing device 1 according to the embodiment is a neckband-type information processing terminal configured to be worn on a neck of a user A, for example. The information processing device 1 includes a speaker and various sensors (such as acceleration sensor, gyro sensor, geomagnetic sensor, and absolute position measuring unit). The information processing device 1 has a function of causing the user to feel as if a virtual character 20 actually exists in a real space through a sound image localization technology for spatially allocating sound information. Note that, the virtual character 20 is an example of the virtual object.

Here, in the case of providing the user A with a content having a strong relation with the real world as if the virtual character 20 exists in a place where the user A is standing as illustrated in FIG. 1, the following matters should be noted.

For example, in the case of providing sound information as if a virtual character who is 170 cm tall is standing on the right side of the user who is 170 cm tall, it is possible to cause the user to feel as if the virtual character is standing next to the user by localizing voice of the virtual character on the right side of the user when the user is stopping. However, in the case where the user is 150 cm tall, the user feels as if the virtual character is 150 cm tall that is the same as the user when the voice of the virtual character is localized on the right side of the user in the same way as the case where the user is 170 cm tall. Therefore, the user does not feel reality of the actual height of the virtual character.

In addition, when the voice of the virtual character is localized on the right side of the user in the case where the user is stopping, the user feels as if the virtual character exists on the right side of the user. However, when the user starts moving forward but the position of the voice of the virtual character does not change, the user cannot feel movement of the virtual character, and the reality is destroyed. More specifically, if the virtual character actually existed, the virtual character would start walking a little bit later than the movement of the user. Therefore, the position of the voice should be changed to a right rear side of the user, and the user should hear footstep sound of the walking virtual character, sound of a bag carried by the virtual character, and the like. In addition, the user should hear sound corresponding to movement of the virtual character such as footstep sound and short breath sound in the case where the virtual character is running, or bicycle sound in the case where the virtual character is riding a bicycle. As described above, the reality of the virtual character is seriously destroyed and this brings a feeling of strangeness when the user cannot hear the sound that should be generated in accordance with movement of the virtual character and the position of the voice of the virtual character corresponding to movement of the user.

Therefore, the information processing device 1 according to the embodiment is capable of appropriately calculating a relative three-dimensional position at which sound is to be localized on the basis of information on a state of a user and a virtual character, and showing presence of the virtual object in the real space as if the virtual object actually exists. The sound causes the user to feel the virtual character. Specifically, for example, the information processing device 1 is capable of causing the user to feel the size of the virtual character by calculating a relative height at which the voice of the virtual character is to be localized on the basis of the height and state (standing, sitting, or the like) of the user A and height information of the virtual character, and localizing a sound image. In addition, the information processing device 1 is also capable of adding reality to the movement of the virtual character by changing the sound of the virtual character in accordance with the state and the movement of the user A. In this case, the information processing device 1 performs control such that sounds are localized on corresponding parts of the virtual character on the basis of types of the sounds, like sound of voice of the virtual character is localized on lips (head) of the virtual character, and footstep sound of the virtual character is localized on feet of the virtual character.

The overview of the information processing device 1 according to the embodiment has been described above. Next, with reference to FIG. 2 and FIG. 3, the configuration of the information processing device 1 according to the embodiment will be described.

<<2. Configuration>>

<2-1. External Configuration>

Figure 2:
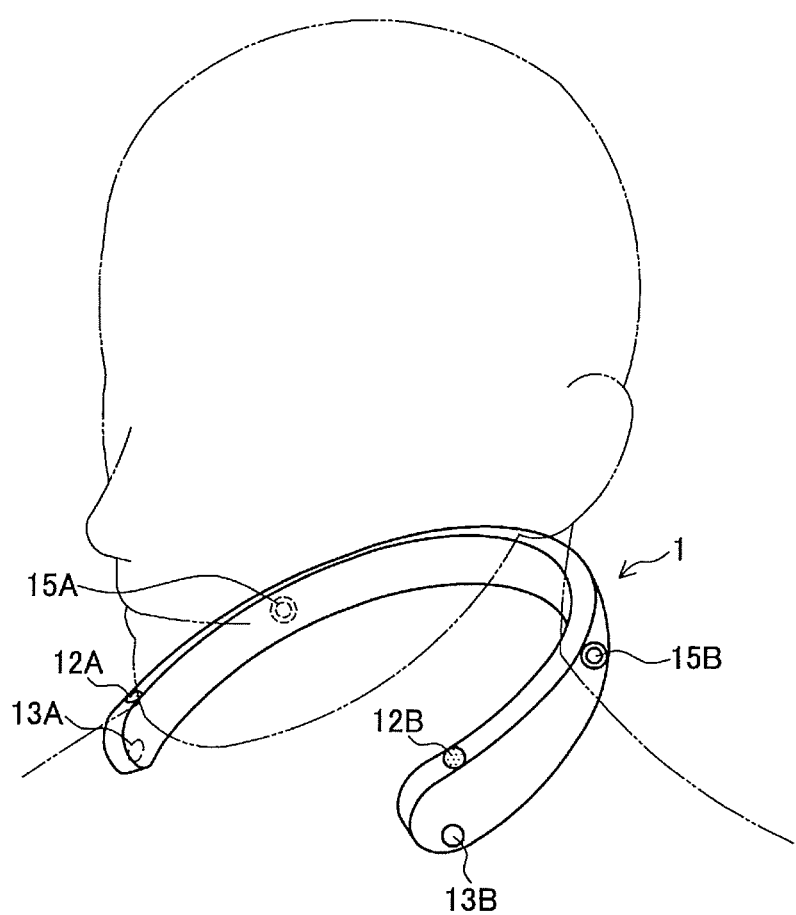
FIG. 2 is a perspective view illustrating an example of an external configuration of the information processing device according to the embodiment.

FIG. 2 is a perspective view illustrating an example of an external configuration of the information processing device 1 according to the embodiment. As illustrated in FIG. 2, the neckband-type information processing device 1 has a wearable unit (wearable part) that goes half around a neck from one side of the neck to the other side of the neck through the back of the neck (back side). The neckband-type information processing device 1 is hung around the neck of the user and worn by the user. FIG. 2 illustrates the perspective view of the wearable unit worn by the user. Note that, in this specification, wording indicating directions such as top, bottom, right, left, front, and rear are used. Such directions are directions from a center of the body of the user (such as epigastrium position) when the user is standing up straight. For example, the "right" means a direction of the right side of the body of the user, the "left" means a direction of the left side of the body of the user, the "top" means a direction of the head side of the user, and the "bottom" means a direction of the foot side of the user. In addition, the "front" means a direction the body of the user faces, and the "rear" means s direction of the back side of the user.

As illustrated in FIG. 2, the wearable unit may be worn on the neck of the user in close contact with the neck of the user, or may be worn on the neck of the user with some interval. Note that, examples of other shapes of the neck hanging type wearable unit include a pendant type wearable unit configured to be worn by the user through a necklace strap and a headset type wearable unit including a neckband that goes around the back side of the neck instead of a headband configured to be worn on the head.

In addition, the way of using the wearable unit may be a way of using the wearable unit while the wearable unit is directly worn on a human body. The way of using the wearable unit while the wearable unit is directly worn on a human body means a way of using the wearable unit in a state where no object is interposed between the wearable unit and the human body. For example, as illustrated in FIG. 2, the case where the wearable unit is worn on the neck of the user in contact with the skin of the neck of the user falls under the above described way of using the wearable unit. In addition, various kinds of ways are considered such as the headset type wearable device and a glasses type wearable device that are directly worn on a head.

Alternatively, the way of using the wearable unit may be a way of using the wearable unit while the wearable unit is indirectly worn on a human body. The way of using the wearable unit while the wearable unit is indirectly worn on a human body means a way of using the wearable unit in a state where some object is interposed between the wearable unit and the human body. For example, the case where the wearable unit illustrated in FIG. 2 is worn in contact with the user through clothing interposed therebetween such as a case where the wearable unit is hidden under a collar of a shirt falls under the above described way of using the wearable unit. In addition, various kinds of ways are considered such as a pendant type wearable unit configured to be worn by the user through a necklace strap and a brooch type wearable unit configured to be put on clothing by using a clip or the like.

In addition, as illustrated in FIG. 2, the information processing device 1 includes a plurality of microphones 12 (12A and 12B), cameras 13 (13A and 13B), and speakers 15 (15A and 15B). The microphones 12 acquire sound data such as voice of the user and environmental sound around the device. The cameras 13 acquire captured image data by capturing images of surroundings. In addition, the speakers 15 play back the sound data. Specifically, the speakers 15 according to the embodiment play back a sound signal of the virtual character subjected to a sound image localization process. The sound signal causes the user to feel as if the virtual character actually exists in the real space.

Note that, FIG. 2 illustrates the configuration of the information processing device 1 including the two microphones 12, the two cameras 13, and the two speakers 15. However, the embodiment is not limited thereto. For example, the information processing device 1 may include one microphone 12 and one camera 13, or may include three microphones 12, three cameras 13, and three speakers 15.

<2-2. Internal Configuration>

Figure 3:
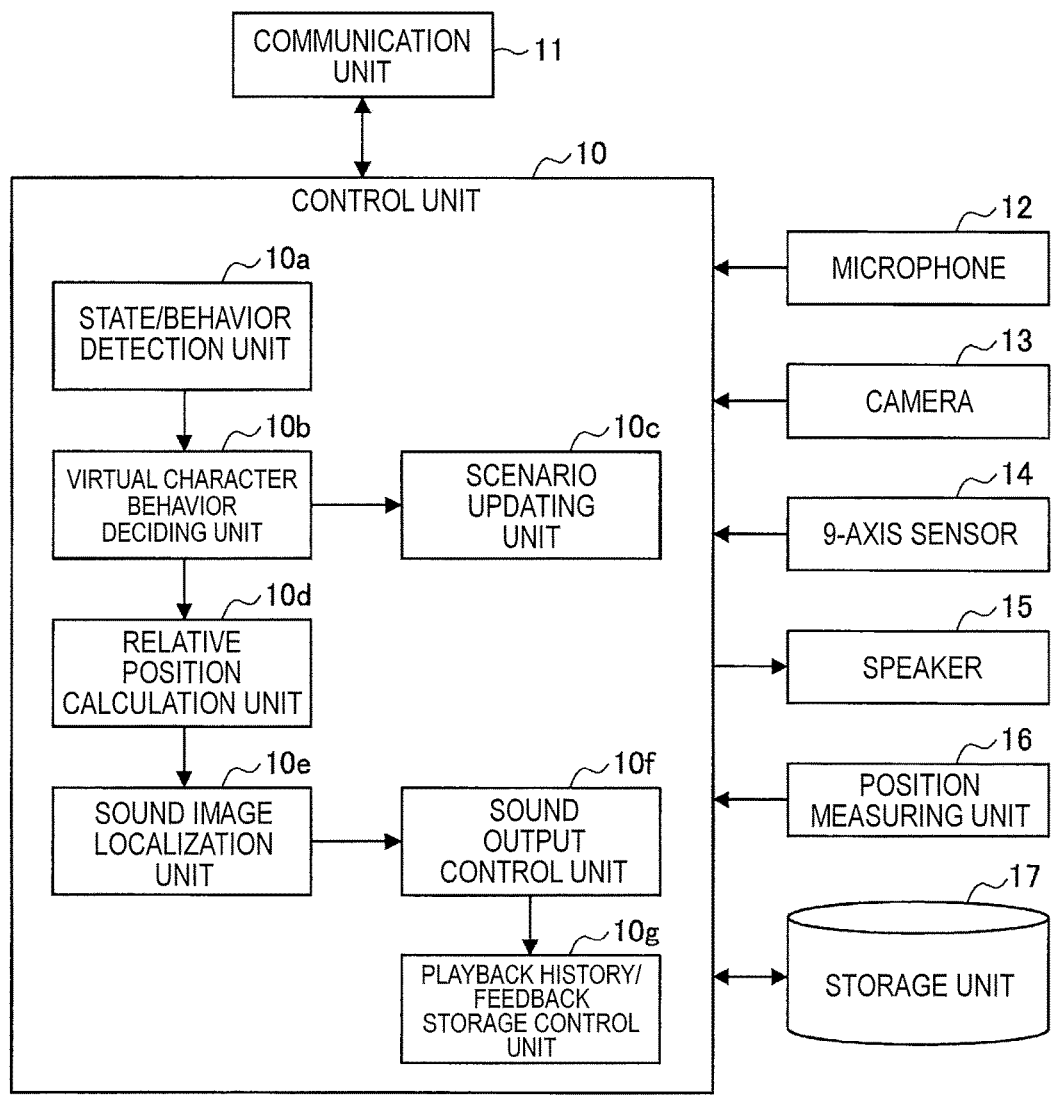
FIG. 3 is a block diagram illustrating an example of an internal configuration of the information processing device according to the embodiment.

Next, with reference to FIG. 3, an internal configuration of the information processing device 1 according to the embodiment will be described. FIG. 3 is a block diagram illustrating an example of an internal configuration of the information processing device 1 according to the embodiment. As illustrated in FIG. 3, the information processing device 1 includes a control unit 10, a communication unit 11, the microphone 12, the camera 13, a 9-axis sensor 14, the speaker 15, a position measuring unit 16, and a storage unit 17.

(Control Unit 10)

The control unit 10 functions as an arithmetic device and a control device to control entire operation in the information processing device 1 in accordance with various kinds of programs. For example, the control unit 10 is implemented by a central processing unit (CPU), and an electronic circuit such as a microprocessor or the like. In addition, the control unit 10 may include read only memory (ROM) for storing programs and arithmetic parameters to be used, and random access memory (RAM) for temporarily storing parameters and the like that arbitrarily change.

In addition, as illustrated in FIG. 3, the control unit 10 according to the embodiment functions as a state/behavior detection unit 10a, a virtual character behavior deciding unit 10b, a scenario updating unit 10c, a relative position calculation unit 10d, a sound image localization unit 10e, a sound output control unit 10f, and a playback history/feedback storage control unit 10g.

The state/behavior detection unit 10a detects a state of a user, recognizes behavior based on the detected state, and outputs the detected state and the recognized behavior to the virtual character behavior deciding unit 10b. Specifically, the state/behavior detection unit 10a acquires positional information and information such as a movement speed, a direction, a height of an ear (or head) as information on the state of the user. The user state is information that can be uniquely specified at the detection timing, and information that can be calculated and acquired as numerical values from the various sensor.

For example, the position information is acquired from the position measuring unit 16. In addition, the movement speed is acquired from the position measuring unit 16, the acceleration sensor included in the 9-axis sensor 14, the camera 13, or the like. The direction is acquired from the camera 13 or the gyro sensor, the acceleration sensor, and the geomagnetic sensor included in the 9-axis sensor 14. The height of the ear (head) is acquired from the physique data of the user, the acceleration sensor, and the gyro sensor. In addition, the movement speed and the direction may be acquired through simultaneous localization and mapping (SLAM) for calculating the movement on the basis of change in feature points in video of surroundings continuously captured by the camera 13.

In addition, the height of the ear (or head) may be calculated on the basis of the physique data of the user. As the physique data of the user, a body height H1, a sitting height H2, and a distance H3 between an ear to the top of the head are set as illustrated in the left side of FIG. 4 and stored in the storage unit 17. For example, the state/behavior detection unit 10a calculates a height of an ear as described below. Note that, as illustrated in the right side of FIG. 4, "E1 (tilt of head)" may be detected by the acceleration sensor, the gyro sensor, or the like as tilt of an upper body.

(Expression 1)

In the case where a user is standing:

Height of ear=body height−sitting height+(sitting height−distance between ear and top of head)×$E1$ (tilt of head)

(Expression 2)

In the case where a user is sitting or lying down:

Height of ear=(sitting height−distance between ear and top of head)×$E1$(tilt of head)

Alternatively, in the case where tilt of a head is close to zero (user is standing up straight), the state/behavior detection unit 10a may calculate an approximate height of an ear as described below.

(Expression 3)

In the case where a user is standing:

Height of ear≈body height−distance between ear and top of head (Expression 4)

In the case where a user is sitting or lying down:

Height of ear≈sitting height−distance between ear and top of head

In addition, the state/behavior detection unit 10*a* is capable of recognizing behavior of the user with reference to before and after states. For example, the behavior of the user is assumed to include "stopping", "walking", "running", "sitting", "lying down", "riding a car", "riding a bicycle", "facing the character", and the like. In addition, the state/behavior detection unit 10*a* is also capable of recognizing behavior of the user by using a predetermined behavior recognition engine on the basis of information detected by the 9-axis sensor 14 (acceleration sensor, gyro sensor, and geomagnetic sensor) and positional information detected by the position measuring unit 16.

The virtual character behavior deciding unit 10*b* decides virtual behavior of the virtual character 20 in the real space in accordance with the behavior of the user recognized by the state/behavior detection unit 10*a* (or select a scenario), and selects a sound content corresponding to the decided behavior from the scenario.

For example, the virtual character behavior deciding unit 10*b* causes the virtual character to perform the same behavior as the user. For example, the virtual character behavior deciding unit 10*b* causes the virtual character 20 to walk when the user is walking, and causes the virtual character 20 to run after the user when the user is running. This enables to show presence of the virtual character.

In addition, when the behavior of the virtual character is decided, the virtual character behavior deciding unit 10*b* selects a sound source corresponding to the behavior of the virtual character from a sound source list (sound contents) stored in advance as a content scenario. In this case, the virtual character behavior deciding unit 10*b* determines whether to play back a sound source with a limited number of playback times, on the basis of a playback log. In addition, it is possible for the virtual character behavior deciding unit 10*b* to select a sound source corresponding to the behavior of the virtual character that matches preference of the user (such as a sound source of a virtual character that the user loves) or that is a sound source of a specific character associated with a current location (place).

For example, in the case where the decided behavior of the virtual character is stopping behavior, the virtual character behavior deciding unit 10*b* selects voice sound content (such as a dialogue or breathing). In the case where the decided behavior of the virtual character is walking behavior, the virtual character behavior deciding unit 10*b* selects voice sound content and footstep sound content (such as footstep sound of high-heeled footwear that is set to be worn by the virtual character). In addition, in the case where the decided behavior of the virtual character is running behavior, the virtual character behavior deciding unit 10*b* selects short breath sound as voice sound content, or selects rustling clothing sound, bag sound (sound of a key chain or the like attached to the bag), running footstep sound, and the like. In addition, in the case where the decided behavior of the virtual character is behavior of riding a bicycle, the virtual character behavior deciding unit 10*b* selects bicycle sound, pedaling sound, sound of a bag put in a basket of the bicycle, and the like. As described above, the sound contents are selected in accordance with behavior of the virtual character, and the different sound contents are paled back in accordance with the behavior (in other words, sound content that does not correspond to the behavior is not selected or played back).

The scenario updating unit 10*c* updates a scenario since sound contents corresponding to the behavior of the virtual character decided by the virtual character behavior deciding unit 10*d* are selected from the scenario and the scenario develops. The scenario is stored in the storage unit 17, for example.

The relative position calculation unit 10*d* calculates a relative three-dimensional position (xy coordinate position and height) at which a sound source (sound content) of the virtual character selected by the virtual character behavior deciding unit 10*d* is to be localized. Specifically, first, the relative position calculation unit 10*d* sets positions of parts of the virtual character corresponding to sound source types with reference to the behavior of the virtual character decided by the virtual character behavior deciding unit 10*b*. Here, with reference to FIG. 5, the parts of the virtual character 20 and corresponding sound source types will be described.

Figure 5:
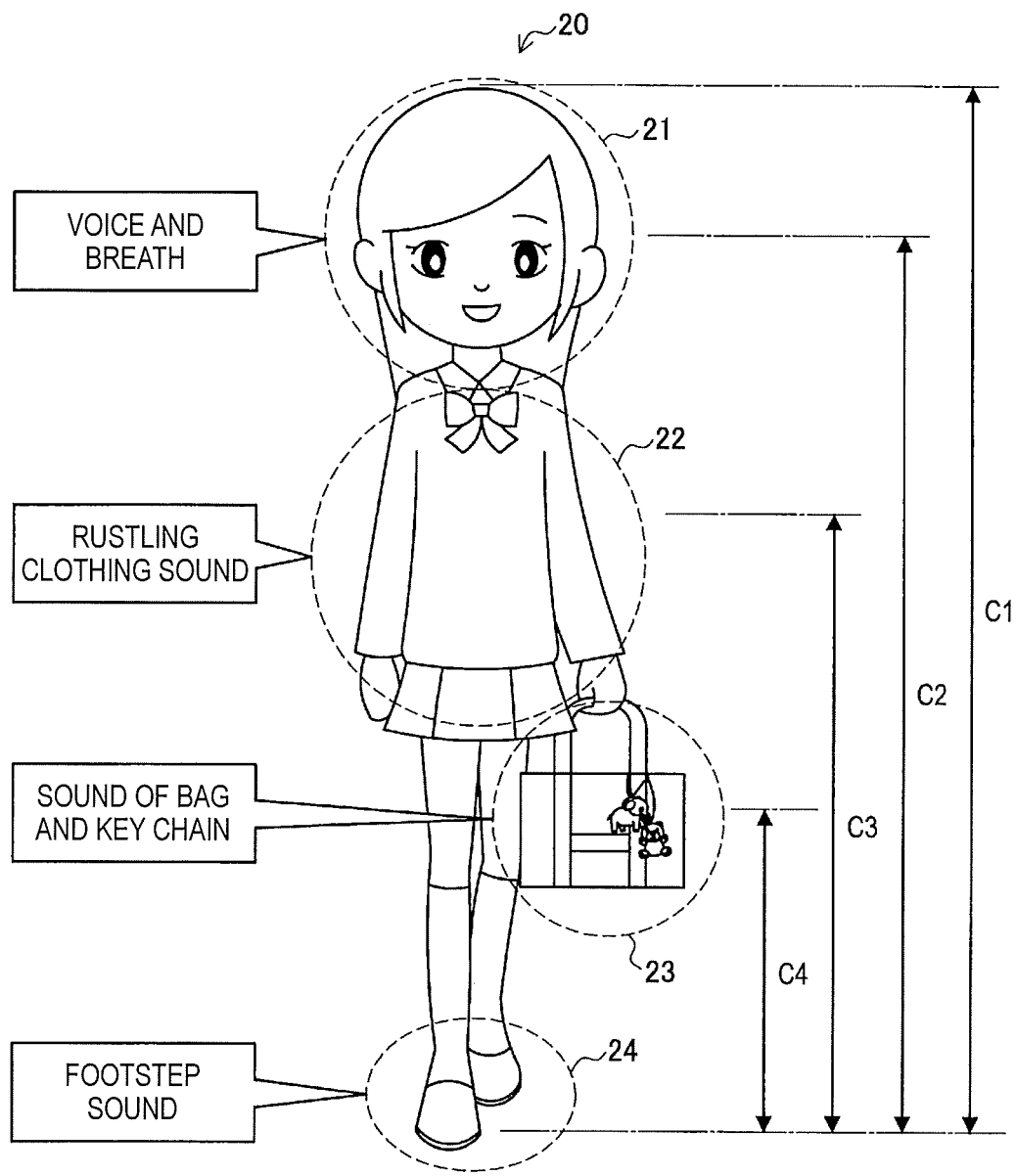
FIG. 5 is an explanatory diagram illustrating a correspondence between parts of a virtual character and sound source types according to the embodiment.

FIG. 5 is an explanatory diagram illustrating a correspondence between the parts of the virtual character 20 and the sound source types. As illustrated in FIG. 5, the virtual character 20 is divided into the parts such as a head 21, a trunk 22, feet 24, and a handheld accessory 23 (for example, bag held in her hand). For example, the sound source types are assumed to include a voice sound source, a rustling clothing sound source, a belonging sound source (such as a bag or a key chain attached to the bag), a footstep sound source, a vehicle sound source, and the like. The voice sound source is associated with the head 21 (especially lips), the rustling clothing sound source is associated with the trunk 22, the belonging sound source is associated with the handheld accessory 23, and the footstep sound source is associated with the feet 24. In addition, the vehicle sound source is associated with surroundings of the virtual character while it is assumed that the virtual character is riding the vehicle (such as a bicycle, a motorbike, or a car). In addition, heights (C2 to C4) of the respective parts may be calculated on the basis of the height C1 of the virtual character 20, or may be stored in advance. Information such as the height C1 of the virtual character 20, the heights (C2 to C4) of the respective parts, correspondence between the parts and the sound source types, and the like is stored in the storage unit 17 as setting information of the virtual character 20, for example.

The relative position calculation unit 10*d* calculates the heights of the sound sources based on the corresponding parts further in accordance with the state/behavior of the virtual character 20. For example, the relative position calculation unit 10*d* calculates a position of the head, a position of the copper, positions of the feet, positions of the belongings, and the like in accordance with a state where the virtual character is stopping, a case where the virtual character is walking, a case where the virtual character is running (while a body tilts), a state where the virtual character is sitting, or a state where the virtual character is lying down.

Figure 8:
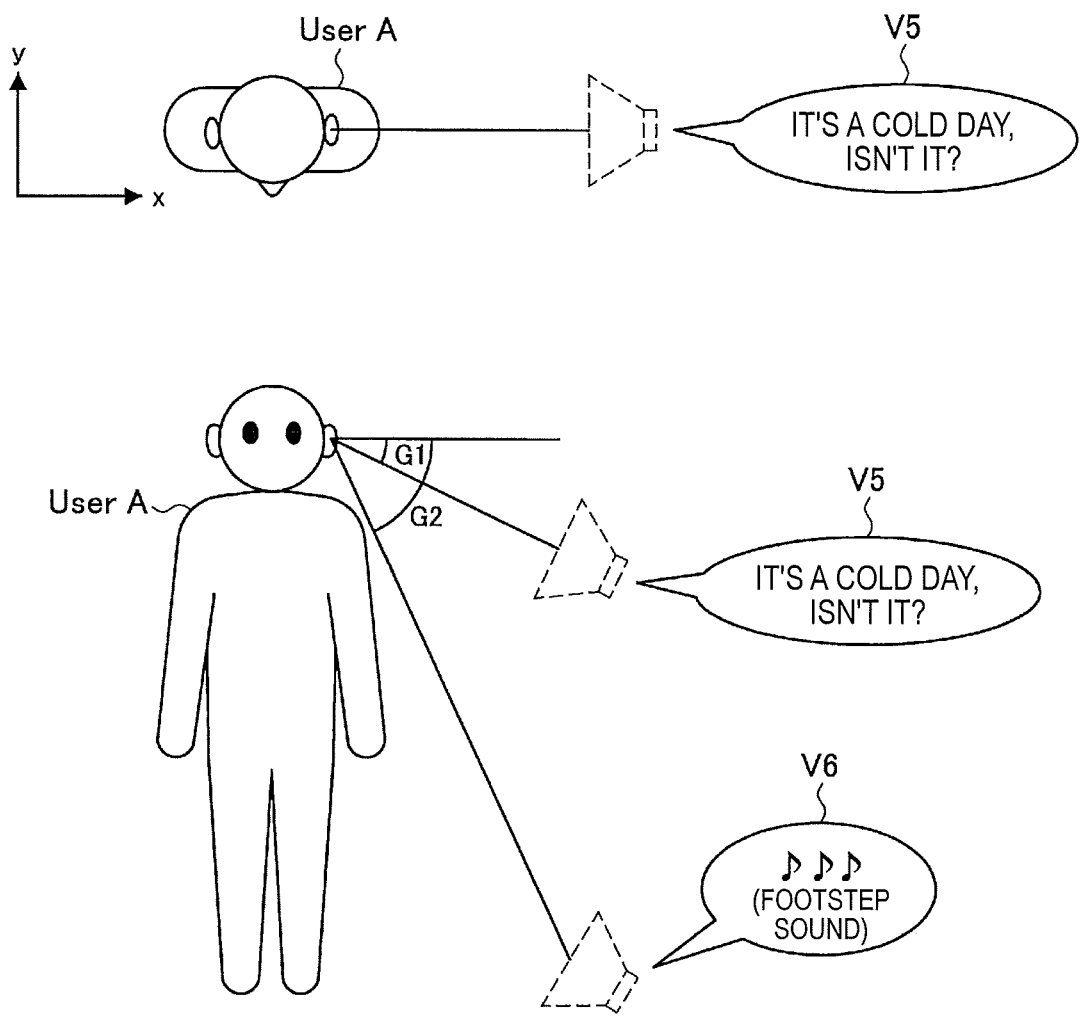
FIG. 8 is an explanatory diagram illustrating an example of sound image localization in accordance with a state of a user and behavior and a height of a virtual character according to the embodiment.

In addition, the relative position calculation unit 10*d* calculates heights of sound contents with respect to the user in accordance with a height and an orientation of an ear (or a head) of the user and positional relations between the heights of the respective sound sources. In addition to the height, the relative position calculation unit 10*d* calculates an xy coordinate position in accordance with the behavior of the user and the behavior of the virtual character. With reference to FIG. 6 to FIG. 8, an example of a sound image localization position (three-dimensional position including xy coordinate position and height) calculated by the relative position calculation unit 10d in such a way will be described.

FIG. 6 to FIG. 8 are each an explanatory diagram illustrating an example of sound image localization in accordance with a state of a user and behavior and a height of a virtual character according to the embodiment. Here, a scenario is assumed in which in the case where the user A is walking on the way home from the station nearest to his home after school or work, a virtual character finds the user A and speaks to the user A, and they starts walking together. The event (sound content provision) to be started by the virtual character behavior deciding unit 10b is triggered when the state/behavior detection unit 10a detects that the user A arrives at the station nearest to his home, goes out a ticket wicket, and starts walking.

First, as illustrated in FIG. 6, an event occurs in which the virtual character 20 finds the walking user A and speaks to the user A, for example. Specifically, as illustrated in the top of FIG. 6, the relative position calculation unit 10d calculates a localization direction of an angle F1 with respect to an ear of the user which is several meters behind the user A, as an xy coordinate position of a sound source of a voice sound content V1 (wow!) to be played back first. Next, the relative position calculation unit 10d calculates an xy coordinate position of a sound source of a footstep sound content V2 (localization direction of an angle F2 with respect to the ear of the user) as if the virtual character 20 is running after the user and gradually approaching the user A. Subsequently, the relative position calculation unit 10d calculates a localization direction of an angle F3 with respect to the ear of the user which is immediately behind the user A, as an xy coordinate position of a sound source of a voice sound content V3 (Hey, A!). As described above, the sound image localization positions (localization directions and distances with respect to the user) are calculated in accordance with the behavior and dialogues of the virtual character such that the user does not feel strangeness in the case where it is assumed that the virtual character actually exists and behaves in the real space. Therefore, it is possible to cause the user to feel the behavior of the virtual character as real.

In addition, the relative position calculation unit 10d calculates heights of the sound image localization positions in accordance with the parts of the virtual character corresponding to the sound content types. For example, in the case where the height of the ear of the user is higher than the head of the virtual character as illustrated in the bottom of FIG. 6, the heights of the sound sources of the voice sound contents V1 and V3 of the virtual character are lower than the height of the ear of the user (lower than the ear of the user by an angle G1). In addition, since the sound source of the footstep sound content V2 of the virtual character is at the feet of the virtual character, the sound source of the footstep sound content V2 is lower than the voice sound sources (lower than the ear of the user by an angle G2). As described above, in the case where it is assumed that the virtual character is actually exists in the real space, the heights of the sound image localization positions are calculated in view of the state (standing, sitting, or the like) and the size (height) of the virtual character. Therefore, it is possible to cause the user to feel presence of the virtual character as real.

Next, in the case where the user A stops and turns to the virtual character 20 as illustrated in the top of FIG. 7, the relative position calculation unit 10d calculates a position of a sound source of a voice sound content V4 of the virtual user such that the position of the sound source of the voice sound content V4 comes in front of the user A. Note that, in this case, the height of the sound source of the voice of the virtual character 20 is also a height relative to the heights of the virtual character and the user (for example, lower than the ear of the user by the angle G1) as illustrated in the bottom of FIG. 7.

Subsequently, when the user A starts walking, behavior of the virtual character 20 is decided to walking behavior at the same speed as the user A, and an event occurs in which the virtual character 20 speaks to the user A during walking. For example, the virtual character behavior deciding unit 10b selects a dialogue such as "it's a cold day, isn't it?" corresponding to today's weather and temperature, or a dialogue such as "I heard that an accident happened in J prefecture today" or "today's stock market is . . . " corresponding to today's news and preference of the user A. Such dialogues may be automatically generated from real-time news information. In addition, the virtual character behavior deciding unit 10b also selects a footstep sound content since the virtual character 20 is walking at the same speed as the user A. As illustrated in FIG. 8, the relative position calculation unit 10d allocates sound contents V5 and V6 on the right side of the user A in accordance with the behavior of the virtual character 20 walking at the same speed as the user A, for example. In addition, as illustrated in the bottom of FIG. 8, the relative position calculation unit 10d calculates sound image localization positions such that the voice sound content V5 is positioned a little bit lower than the user A (lower than the user by angle G1), and the footstep sound content V6 is positioned at the feet of the virtual character 20 (lower than the user by angle G2).

Note that, the scenario may have a plurality of bifurcation points, and different events may occur depending on behavior of the user. For example, in the case where the user A does not stop or turn to the virtual character unlike FIG. 7, an event may occur in which a sound content "Stop! Wait pleaaase!" is output, the voice of the virtual character 20 becomes small (since the user A continues walking), and the scenario ends.

In addition, the information processing device 1 may perform a process for registering concert information into a schedule of the user A, when the concert information or the like is advertised in the virtual character's statement to the user A and the user performs operation (such as tapping on the neckband type wearable unit) to answer yes.

The specific examples of the sound image localization positions have been described above. The relative position calculation unit 10d outputs the sound image localization positions (three-dimensional positions) of the respective calculated sound contents to the sound image localization unit 10e.

The sound image localization unit 10e performs a sound signal process on the sound contents such that a corresponding sound content (sound source) selected by the virtual character behavior deciding unit 10d is localized at a sound image localization position calculated by the relative position calculation unit 10d for each sound content.

The sound output control unit 10f performs control such that the speakers 15 play back the sound signal processed by the sound image localization unit 10e. Therefore, it is possible for the information processing device 1 according to the embodiment to localize sound images of sound contents corresponding to behavior of the virtual character depending on the state/behavior of the user at appropriate positions, distances, heights with respect to the user, show reality of the behavior and size of the virtual character, and increase presence of the virtual character in the real space.

The playback history/feedback storage control unit 10g performs control such that the storage unit 17 stores the sound sources (sound contents) output by the sound output control unit 10f as a history (playback log).

In addition, the playback history/feedback storage control unit 10g also performs control such that the storage unit 17 stores responses of the user as feedback. Example of the responses of the user include turning of the user to a voice direction or stopping to listen to the voice dialogue when the sound output control unit 10f outputs the voice. This enables the control unit 10 to learn preference of the user, and it is possible for the virtual character behavior deciding unit 10b to select a sound content depending on the preference of the user.

(Communication Unit 11)

The communication unit 11 is a communication module to transmit/receive data to/from another device in a wired/wireless manner. The communication unit 11 communicates directly with external devices or wirelessly communicates with the external devices via a network access point, by means of a wired local area network (LAN), a wireless LAN, Wireless Fidelity (Wi-Fi) (registered trademark), infrared communication, Bluetooth (registered trademark), or the like, by using near field communication, non-contact communication, or the like.

For example, in the case where the above described functions of the control unit 10 are included in another device such as a smartphone or a server on cloud, the communication unit 11 may transmit data acquired by the microphones 12, the cameras 13, and the 9-axis sensor 14. In this case, the another device decides behavior of the virtual character, selects a sound content, calculates a sound image localization position, or performs a sound image localization process. Alternatively, for example, in the case where another device includes the microphones 12, the cameras 13, or the 9-axis sensor 14, the communication unit 11 may receive data acquired by them and outputs the received data to the control unit 10. In addition, the communication unit 11 may receive a sound content selected by the control unit 10 from another device such as a server on cloud.

(Microphone 12)

The microphone 12 collects voice of a user and a surrounding environment, and outputs them to the control unit 10 as sound data.

(Camera 13)

The camera 13 includes a lens system, a drive system, and solid state image sensor array, and the like. The lens system includes an imaging lens, a diaphragm, a zoom lens, a focus lens, and the like. The drive system causes the lens system to carry out focus operation and zoom operation. The solid state image sensor array performs photoelectric conversion on imaging light acquired through the lens system to generate an imaging signal. The solid state image sensor array may be implemented by charge-coupled device (CCD) sensor array or complementary metal-oxide-semiconductor (CMOS) sensor array, for example. For example, the camera 13 may be configured to capture an image of a front side of a user in a state where the information processing device 1 (wearable unit) is worn by the user. In this case, the camera 13 is capable of capturing an image of surrounding scenery that follows movement of the user, for example. In addition, the camera 13 may be configured to capture an image of a face of a user in a state where the information processing device 1 is worn by the user. In this case, the information processing device 1 is capable of specifying a position of an ear of the user and facial expression of the user from the captured image. In addition, the camera 13 outputs data of the captured image that has been converted into a digital signal, to the control unit 10.

(9-Axis Sensor 14)

The 9-axis sensor 14 includes a triaxial gyro sensor (configured to detect angular velocity (rotation speed)), a triaxial acceleration sensor (configured to detect acceleration at the time of movement. Also referred to as a G sensor), and a triaxial geomagnetic sensor (configured to detect an absolute direction (orientation) and serve as a compass). The 9-axis sensor 14 has a function of sensing a state of a user wearing the information processing device 1 or a surrounding state. Although the 9-axis sensor 14 is an example of the sensor unit, the embodiment is not limited thereto. For example, a velocity sensor, a vibration sensor, and the like may further be used, or at least one of the acceleration sensor, the gyro sensor, and the geomagnetic sensor may be used. In addition, the sensor unit may be installed in a device other than the information processing device 1 (wearable unit), or may be divided and installed in a plurality of device. For example, the acceleration sensor, the gyro sensor, and the geomagnetic sensor may be installed in a device configured to be worn on a head (such as an earphone), and the velocity sensor and the vibration sensor may be installed in a smartphone. The 9-axis sensor 14 outputs information indicating a sensing result to the control unit 10.

(Speaker 15)

Under the control of the sound output control unit 10f, the speaker 15 plays back the sound signal processed by the sound image localization unit 10e. In addition, the speaker 15 is also capable of outputting a plurality of sound sources in any positions/directions after converting into stereophonic sound.

(Position Measuring Unit 16)

The position measuring unit 16 has a function of detecting a current position of the information processing device 1 on the basis of a signal acquired from an outside. Specifically, for example, the position measuring unit 16 is implemented by a Global Positioning System (GPS) unit, receives a signal from a GPS satellite, detects a position of the information processing device 1, and outputs information on the detected position to the control unit 10. In addition to the GPS, the information processing device 1 may detect a position through Wi-Fi (registered trademark), Bluetooth (registered trademark), transmission/reception to/from a mobile phone, a PHS, a smartphone, or the like, near-field communication, or the like.

(Storage Unit 17)

The storage unit 17 stores programs and parameters to be used by the control unit 10 executing the above described functions. In addition, the storage unit 17 according to the embodiment stores scenarios (various sound contents), setting information of virtual characters (shape, height, and the like), and user information (name, age, home, job, office, physique data, hobby, preference, and the like). Note that, at least a piece of information stored in the storage unit 17 may be stored in another device such as a server on cloud.

The specific configuration of the information processing device 1 according to the embodiment has been described above.

<<3. Operation>>

Figure 9:
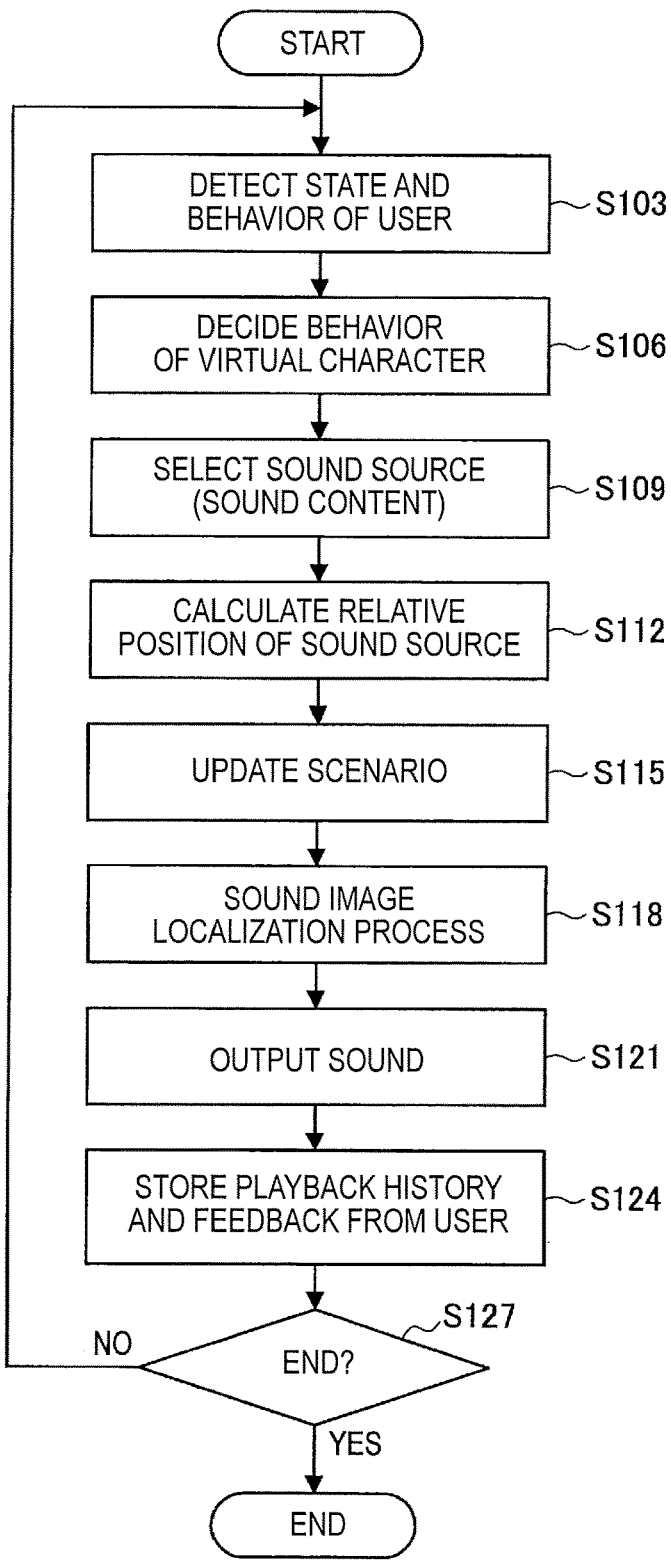
FIG. 9 is a flowchart illustrating a sound process performed by the information processing device according to the embodiment.

Next, with reference to FIG. 9, a sound process performed by the information processing device 1 according to the embodiment will be described. FIG. 9 is a flowchart illustrating a sound process according to the embodiment.

As illustrated in FIG. 9, in Step S103, the state/behavior detection unit 10a of the information processing device 1 first detects a state and behavior of a user on the basis of information detected by various sensors (microphone 12, camera 13, 9-axis sensor 14, or position measuring unit 16).

Next, in Step S106, the virtual character behavior deciding unit 10b decides behavior of a virtual character to be played back in accordance with the detected state and behavior of the user. For example, the virtual character behavior deciding unit 10b decides to perform the same behavior as the detected behavior of the user (the virtual character walks together when the user is walking, the virtual character runs together when the user is running, the virtual character sits together when the user is sitting, and the virtual character lies down when the user is lying down).

Next, in Step S109, the virtual character behavior deciding unit 10b selects a sound source (sound content) corresponding to the decided behavior of the virtual character from a scenario.

Next, in Step S112, the relative position calculation unit 10d calculates a relative position (three-dimensional position) of the selected sound source on the basis of the detected state and behavior of the user, physique data of the user registered in advance such as height, decided behavior of the virtual character, and setting information of the virtual character registered in advance such as height.

Next, in Step S115, the scenario updating unit 10c updates the scenario in accordance with the decided behavior of the virtual character and the selected sound content (in other words, proceeds to next event).

Next, in Step S118, the sound image localization unit 10e performs the sound image localization process on the corresponding sound content such that a sound image is localized at a calculated relative position of the sound image.

Next, in Step S121, the sound output control unit 10f performs control such that the speakers 15 play back a sound signal subjected to the sound image localization process.

Next, in Step S124, the playback history/feedback storage control unit 10g causes the storage unit 17 to store a history of sound contents that have been played back (in other words, sound of the sound contents have been output) and feedback from the user with regard to the sound contents.

Next, in Step S127, S103 to S124 described above are repeated until the event in the scenario ends. For example, in the case of a scenario until the user gets home after arriving at a nearest station, a start of the scenario is triggered when the user gets out of the nearest station and starts walking, and the scenario ends when the user gets home.

Note that, the scenario according to the embodiment is not limited to the above described example, and various scenarios can be used. For example, a scenario associated with a shop such as a convenience store selling a target item can be used. In this case, a start of the scenario is triggered when the user enters a predetermined convenience store, and the scenario ends when the user gets out of the convenience store. For example, a scenario that advertises an item starts when the state/behavior detection unit 10a detects that the user enters the convenience store and the user looks at a predetermined poster at the store (such as a poster of an item that is advertised by an animation character in an animation program that the user has watched recently or by a pop star that the user loves). Specifically, the information processing device 1 localizes a sound image of voice of a virtual character near the user and plays back the sound such that a sound of an opening door of the convenience store and a sound of approaching footsteps are heard, and the virtual character speaks "Oh! did you see our poster? Our song is used as an advertising jingle of this snack!". In this case, the information processing device 1 localizes a sound source of the voice of the virtual character at a height with a predetermined angle with respect to an ear of the user in view of the height of the user and the height of the virtual character. Therefore, the user can feel as if the virtual character actually has entered the store, approached the user, and spoken to the user. Accordingly, the user is motivated to have a look at the recommended item, and improved advertisement effects can be obtained.

In addition, as illustrated in FIG. 10, when it is detected that the user is in front of the target item on the shelf from an image captured by the camera 13, the information processing device 1 plays back a sound content V7 such as "This snack is very yummy!" by using the voice of the virtual character advertising this item. Examples of the virtual character include imaginary characters such as an animation character or a character in a drama, and real people such as pop stars, actor/actress, and TV characters, and animals.

For example, as illustrated in FIG. 10, the information processing device 1 performs control such that the sound image localization position of the sound content V7 is on a right rear side of the user A and at an appropriate height of the virtual character relative to the height of the user A. Thereby, the user A can feel presence of the virtual character (such as pop star that the user A loves) as real. In addition, when the user feels as if the virtual character actually has been near the user and spoken to the user, the user A is motivated to buy the recommended item and improved advertisement effects can be obtained.

<<4. Conclusion>>

As described above, the information processing device according to the embodiment is capable of appropriately calculating a relative three-dimensional position at which sound is to be localized on the basis of information on a state of a user and a virtual character, and showing presence of the virtual character in the real space as real. The sound causes the user to feel the virtual character (example of virtual object).

For example, it is possible to cause the user to feels the size of the virtual character in the real space as real by calculating the height of the sound image localization position of the voice of the virtual character in view of the height of the user and the height of the virtual character. This causes the user to understand more about the virtual character and become deeply attached to the virtual character. For example, although the user has thought that the character is taller than him/her, the user understands that the character is smaller than him/her when a sound image of the voice of the character is localized in the real space and played back according to the embodiment.

In addition, playback of sound depending on the decided movement of the virtual character (such as footstep sound, rustling clothing sound, bag movement sound, or the like) performed by the information processing device 1 can show reality of the movement of the virtual character.

In addition, even when the virtual character does not speak, it is possible to show the user that the virtual character exists in the real space by providing sound generated by the behavior of the virtual character such as a footstep sound or a rustling clothing sound.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, ROM, and RAM, which are embedded in the above described information processing device 1, to execute the above-described functions of the information processing device 1. Moreover, it may be possible to provide a computer-readable recording medium having the computer program stored therein.

In addition, the information processing device 1 according to the embodiment may be implemented by an information processing system including a mobile terminal (such as a smartphone) that mainly has the function of headphones (or earphone, eyewear, or the like) provided with the speaker 15 and the functions of the control unit 10. In this case, the mobile terminal transmits a sound signal subjected to the sound image localization process to the headphones and causes the headphones to play back the sound signal. In addition, the speaker 15 is not limited to a speaker installed in a device configured to be worn by a user. For example, the speaker 15 may be implemented by environmental speakers installed around the user. In this case, the environmental speakers are capable of localizing a sound image at any position around the user.

In addition, according to the above described embodiment, the presence of the virtual character is shown only by voice. However, the embodiment is not limited thereto. For example, in the case where the information processing device 1 is an eyewear type device, it is also possible to add reality of the virtual character by combining the sound image localization according to the embodiment and superposition display of video of the virtual character on the real space.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a calculation unit configured to calculate a localization position of a sound source of a virtual object relative to a user on the basis of information on the virtual object and information on a state of the user, the virtual object causing the user to feel as if the virtual object exists in a real space through sound image localization; and a sound image localization unit configured to perform a sound signal process of the sound source such that a sound image is localized at the calculated localization position.

(2)

The information processing device according to (1), in which the relative localization position of the sound image is a three-dimensional position including a height.

(3)

The information processing device according to (2), further including a sound output control unit configured to perform control such that a sound output unit plays back a sound signal processed by the sound image localization unit.

(4)

The information processing device according to (3), in which the information on the state of the user includes an absolute position, a movement speed, a direction, a position of a head, and a height of an ear of the user, and behavior recognized from them.

(5)

The information processing device according to (4), in which the virtual object is a virtual character, and the information processing device further includes a behavior deciding unit configured to decide virtual behavior of the virtual character in the real space in accordance with the recognized behavior of the user, and select a sound content corresponding to the decided behavior from a scenario as a sound image of the virtual object.

(6)

The information processing device according to (5), in which the calculation unit calculates a localization position of the selected sound content on the basis of a sound source type of the sound content.

(7)

The information processing device according to (6), in which the sound source type of the sound content includes a voice sound source, a footstep sound source, a rustling clothing sound source, a belonging sound source, and a vehicle sound source, and the calculation unit calculates a height at which the sound content is to be localized on the basis of a relative relation between a height of a part of the virtual character corresponding to the sound source type and a height of a head of the user based on the information on the state of the user.

(8)

The information processing device according to (7), in which the calculation unit calculates the height on the basis of a relative positional relation with an ear of the user.

(9)

The information processing device according to (7) or (8), in which the part of the virtual character is a head, a trunk, a leg, a shoe, a bag carried by the virtual character, or a vehicle the virtual character is riding, and a position of the part of the virtual character is calculated on the basis of the information on the virtual object and the decided behavior of the virtual character.

(10)

The information processing device according to any one of (5) to (9), further including an updating unit configured to update the scenario when the sound content corresponding to the decided behavior of the virtual character is selected from the scenario.

(11)

An information processing method including:

calculating, by a calculation unit, a localization position of a sound source of a virtual object relative to a user on the basis of information on the virtual object and information on a state of the user, the virtual object causing the user to feel as if the virtual object exists in a real space through sound image localization; and performing, by a sound image localization unit, a sound signal process of the sound source such that a sound image is localized at the calculated localization position.

(12)

A program causing a computer to function as:

a calculation unit configured to calculate a localization position of a sound source of a virtual object relative to a user on the basis of information on the virtual object and information on a state of the user, the virtual object causing the user to feel as if the virtual object exists in a real space through sound image localization; and a sound image localization unit configured to perform a sound signal process of the sound source such that a sound image is localized at the calculated localization position.

REFERENCE SIGNS LIST 1 information processing device
10 control unit
10a state/behavior detection unit
10b virtual character behavior deciding unit
10c scenario updating unit
10d relative position calculation unit
10e sound image localization unit
10f sound output control unit
10g playback history/feedback storage control unit
11 communication unit
12 microphone
13 camera
14 9-axis sensor
15 speaker
16 position measuring unit
17 storage unit
20 virtual character

The invention claimed is:

1. An information processing device comprising:
9-axis sensor circuitry configured to sense real-world sensory information of a real-world user to generate information indicative of a state of the real-world user who is wearing the information processing device, the state being an indication of a physical state in the real-world;
calculation circuitry configured to produce a relative localization position of virtual image information of a virtual image, the virtual image having an associated sound source, the relative localization position is relative to a real-world position of the real-world user,
wherein the relative localization position is based on the virtual image information and the state of the real-world user, the virtual image information is associated with the virtual image which would exist as if the virtual object existed in a real-world space;
sound image localization circuitry configured to process a sound signal of the sound source such that a sound image source is created as being sourced from the calculated relative localization position of the virtual image information;
wherein the relative localization position of the virtual image information is a three-dimensional position including a height and left-to-right and front-to-back positions, all of which are relative to the real-world position of a center of a body of the user; and
sound output control circuitry configured to play the processed sound signal according to the relative localization position of the virtual image information.

2. The information processing device according to claim 1,
wherein the 9 axis sensor circuitry configured is configured to detect acceleration as information used in determining the state of the real-world position of the user.

3. The information processing device according to claim 1, further comprising
camera circuitry configured to capture video of real-world surroundings to use with simultaneous localization and mapping (SLAM) circuitry to calculate movement speed and direction of the real-world user.

4. An information processing device according to claim 1, wherein the information on the state of the user includes an absolute position, a movement speed, a direction, a position of a head, and a height of an ear of the user, and behavior recognized from them.

5. An information processing device according to claim 1, wherein the virtual object is a virtual character, and the information processing device further comprises behavior deciding circuitry configured to decide virtual behavior of the virtual character in the real-world space in accordance with the recognized behavior of the user, and select a sound content corresponding to the decided behavior from a scenario as the sound image of the virtual object.

6. An information processing device according to claim 5, wherein the calculation circuitry calculates a localization position of the selected sound content on the basis of a sound source type of the sound content.

7. An information processing device according to claim 6, wherein the sound source type of the sound content includes any one of: a voice sound source, a footstep sound source, a rustling clothing sound source, a belonging sound source, and a vehicle sound source, and the calculation circuitry calculates a height at which the sound content is to be localized on the basis of a relative relation between a height of a part of the virtual character corresponding to the sound source type and a height of a head of the user based on the information on the state of the user.

8. An information processing device according to claim 7, wherein the calculation circuitry calculates the height on the basis of a relative positional relation with an ear of the real-world user.

9. An information processing device according to claim 7, wherein the part of the virtual character is a head, a trunk, a leg, a shoe, a bag carried by the virtual character, or a vehicle the virtual character is riding, and a position of the part of the virtual character is calculated on the basis of the information on the virtual object and the decided behavior of the virtual character.

10. An information processing device according to claim 5, further comprising an updating circuitry configured to update the scenario when the sound content corresponding to the decided behavior of the virtual character is selected from the scenario.

11. An information processing method comprising:
sensing real-world sensory information of a real-world user to generate information indicative of a state of the real-world user who is wearing the information processing device, the state being an indication of a physical state in the real-world;
a relative localization position of virtual image information of a virtual image, the virtual image having an associated sound source, the relative localization position is relative to a real-world position of the real-world user;
wherein the relative localization position is based on the virtual image information and the state of the real-world user, the virtual image information is associated with the virtual image which would exist as if the virtual object existed in a real-world space;
processing a sound signal of the sound source such that a sound image source is created as being sourced from the calculated relative localization position of the virtual image information;
wherein the relative localization position of the virtual image information is a three-dimensional position including a height and left-to-right and front-to-back positions, all of which are relative to the real-world position of a center of a body of the user; and playing the processed sound signal according to the relative localization position of the virtual image information.

12. A program causing a computer to function as:

sensing real-world sensory information of a real-world user to generate information indicative of a state of the real-world user who is wearing the information processing device, the state being an indication of a physical state in the real-world;

a relative localization position of virtual image information of a virtual image, the virtual image having an associated sound source, the relative localization position is relative to a real-world position of the real-world user;

wherein the relative localization position is based on the virtual image information and the state of the real-world user, the virtual image information is associated with the virtual image which would exist as if the virtual object existed in a real-world space;

processing a sound signal of the sound source such that a sound image source is created as being sourced from the calculated relative localization position of the virtual image information;

wherein the relative localization position of the virtual image information is a three-dimensional position including a height and left-to-right and front-to-back positions, all of which are relative to the real-world position of a center of a body of the user; and playing the processed sound signal according to the relative localization position of the virtual image information.

* * * * *